United States Patent [19]

Heyl

[11] 4,304,822

[45] Dec. 8, 1981

[54] COATED METAL TUBING

[75] Inventor: Russell G. Heyl, Birmingham, Mich.

[73] Assignee: International Telephone and Telegraph Corp., New York, N.Y.

[21] Appl. No.: 156,378

[22] Filed: Jun. 4, 1980

Related U.S. Application Data

[63] Continuation of Ser. No. 35,324, May 2, 1979, abandoned.

[51] Int. Cl.[3] .............................................. B32B 15/02

[52] U.S. Cl. .................................... 428/623; 138/146; 427/406; 427/46; 427/349; 427/367; 428/626; 428/645

[58] Field of Search ................. 427/406, 46, 349, 367, 427/345, 445, 388.2, 383.7; 428/626, 645, 658, 623; 138/146

[56] References Cited

U.S. PATENT DOCUMENTS 3,687,738 8/1972 Malkin ................................ 148/6.2

*Primary Examiner*—Ralph S. Kendall

*Attorney, Agent, or Firm*—James B. Raden; Harold J. Holt

[57] ABSTRACT

Corrosion resistant coatings are applied to metal tubing while substantially continuously moving the metal tubing through a series of stations. The process comprises the sequential steps of flowing by gravity a zinc-rich thermosetting coating suspended in a volatile carrier onto the tubing, the viscosity of the coating composition being such that it flows around and completely covers the external surface of the tubing, removing excess coating by means of an air blower arranged circumferentially around the tubing and sequentially heating the coated tubing first to volatize off the carrier and then more rapidly to crosslink the thermosetting coating composition.

5 Claims, 6 Drawing Figures

COATED METAL TUBING

Figure 1:
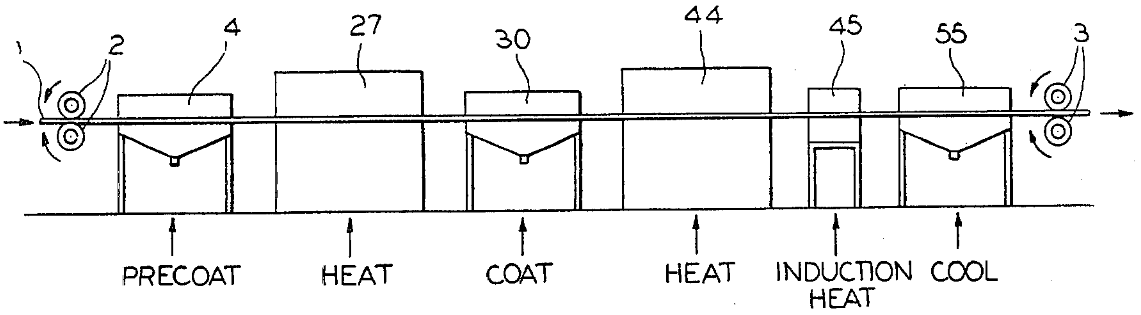

This is a continuation of application Ser. No. 35,324 filed May 2, 1979, abandoned.

This invention relates to a process of applying a corrosion resistant coating to metal tubing.

Increasingly greater emphasis has been placed on improving the corrosion resistance of the exposed portions of motor vehicles. Zinc-rich coatings are known to enhance the corrosion resistance of metal substrates and are widely used for coating many of the more vulnerable areas of automobiles and trucks. See for example U.S. Pat. Nos. 3,671,331 and 3,687,738. However, known processes, including dip coating, roller coating, curtain coating, spray or brush coating, used for applying such coatings to flat, or relatively flat surfaces, are not applicable on an industrial scale to small diameter tubing such as that used for gasoline or brake fluids. The shape and size of such tubing, normally of less than ¾ inch diameter, renders all such known processes ineffective or commercially impractical at the speeds necessary to make such processes economically feasible.

Accordingly, it is a primary object of this invention to provide an effective and economic process for producing corrosion resistant coatings on metal tubing.

It is another object of this invention to provide a process for producing coatings on metal tubing which coatings are uniform and possess consistently high corrosion resistant properties.

It is a more particular object of this invention to provide a process for producing at relatively high speeds corrosion resistant coatings on small diameter automotive tubing.

The foregoing and other objects are achieved by a process which involves the application of a corrosion resistant coating to metal tubing while substantially continuously moving the metal tubing through a series of stations. The process comprises the sequential steps of flowing by gravity a zinc-rich thermosetting coating composition suspended in a volatile carrier onto the tubing, the viscosity of the coating composition being sufficient to flow around and completely cover the external surface of the tubing, removing excess coating from the surface of the tubing by means of an air blower arranged circumferentially around the tubing, and sequentially heating the coated tubing to a first temperature of from 350° to 500° F., preferably 375° to 450° F., to evaporate the volatile carrier and then rapidly heating by induction the coated tubing to a temperature of from 400° to 575° F., preferably 425° to 525° F., to completely crosslink the thermosetting coating composition. The process has been found effective to produce a high quality corrosion resistant coating on tubing at processing speeds in excess of 50 feet per minute. This renders the process economically practical to use for the production on an industrial scale of large quantities of coated, corrosion resistant, tubing. The process is applicable to tubing of virtually any diameter, which is subject to corrosion in use. It may, for example, be used on steel conduit for electrical cable of a size ranging up to several inches in diameter. It is, however, particularly useful for small diameter automotive tubing having a diameter of ¾ inch or less.

Figure 2:
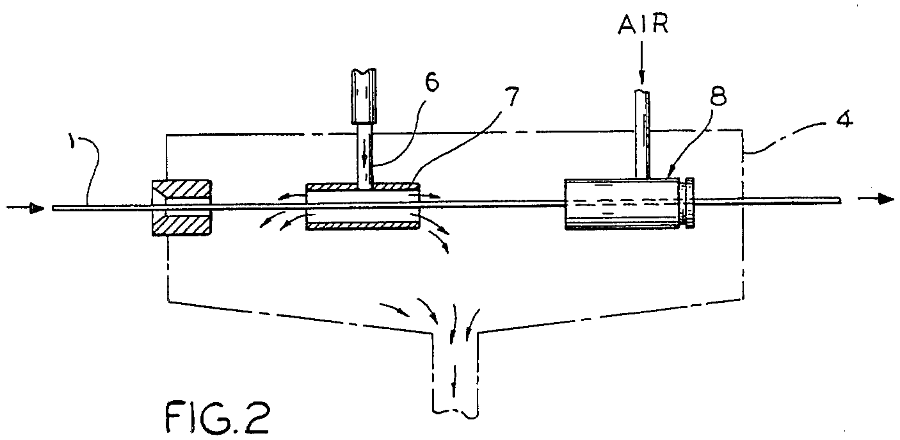
Figure 3:
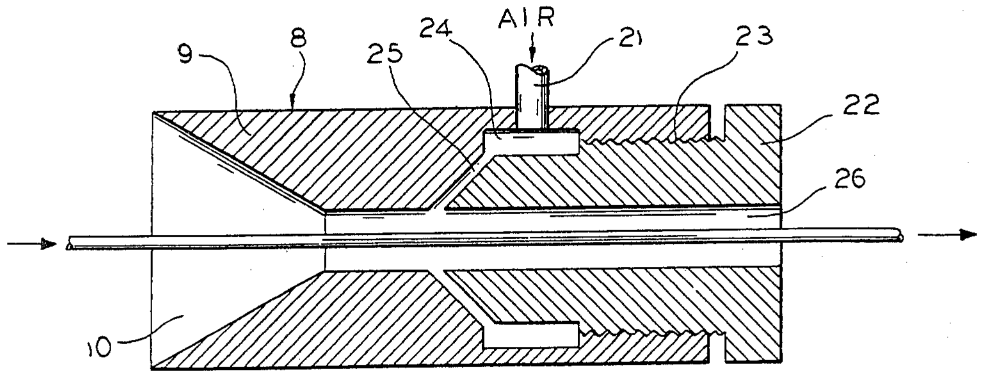
Figure 4:
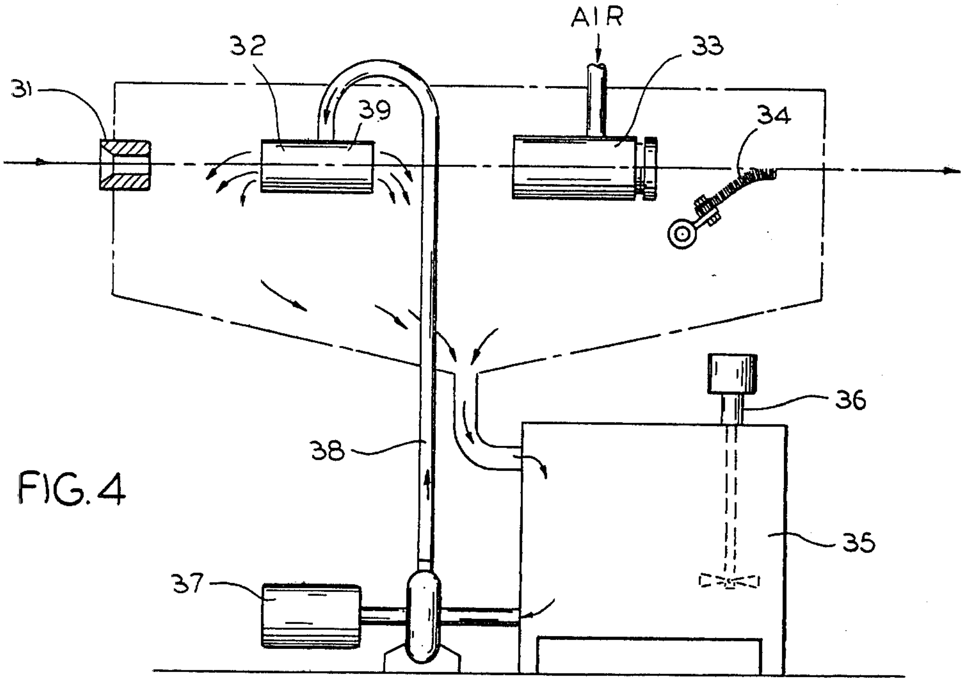
Figure 5:
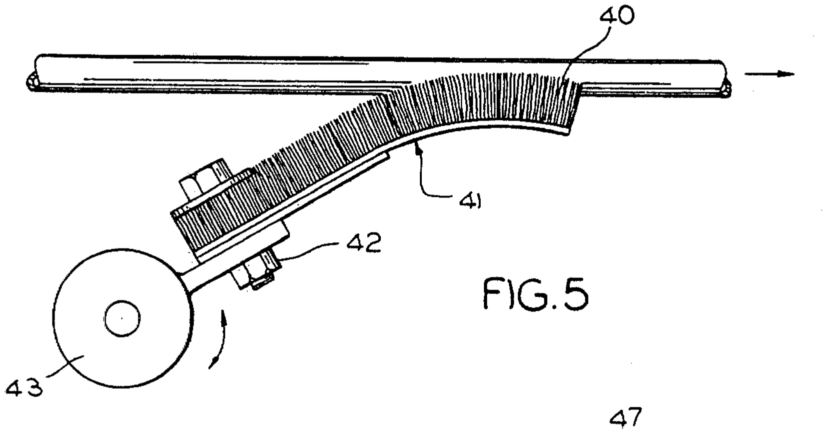
Figure 6:
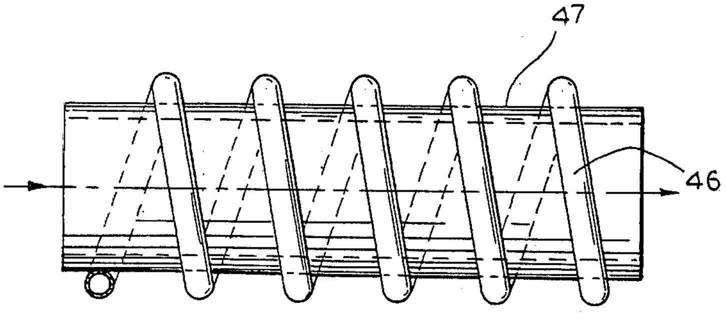

The invention will be better understood by reference to the accompanying drawing in which FIG. 1 is a partially schematic, partially block diagram of a production line for producing corrosion resistant tubing, in accordance with one embodiment of the invention, FIG. 2 is a longitudinal view partially in cross section, of the initial station of FIG. 1 for precoating the tubing, FIG. 3 is a longitudinal view in cross section of the air blower shown in FIG. 2, FIG. 4 is a longitudinal view, partially in cross section, of the coating station of FIG. 1, FIG. 5 is an enlarged view of the wiper device shown in FIG. 4, and FIG. 6 is an enlarged view of the induction coil shown in FIG. 1.

In its preferred form, the process of the invention involves the application of a dual layer coating to the tubing. The first coating or precoating is a conditioner to enhance the adherence of the second, zinc-rich coating, to the tubing. With the exception of the induction heating step which is normally unnecessary for the precoating, the two coatings may be applied by essentially the same sequential steps. The following detailed discussion of the process includes a description of the application of both the precoating as well as the zinc-rich coating.

The process of the invention is preferably applied to small diameter steel tubing previously coated via the hot dip process with a "terne" coating, a corrosion resistant alloy of from 7 to 20% tin, balance lead. Such terne coated tubing, ranging in size from ⅛" to ¾" outer diameter, is widely used for fuel hydraulic brake lines and other uses in automobiles and trucks. The larger diameter automotive tubing is sometimes uncoated steel tubing. The tube should have been previously cleaned in caustic and rinsed. As shown in FIG. 1, the cleaned tube 1 is fed between driving rolls 2 which together with driving rolls 3 at the opposite end of the line continuously move the tube through a series of stations. The first of these stations is a precoating tank 4. As shown more clearly in FIG. 2, precoating tank 4 contains a guide 5 through which the tube enters the tank. A precoating composition is pumped from a mixing tank (not shown) where the precoating composition is agitated to keep the composition in suspension. The precoating composition or conditioner flows through pipe 6 into a tube 7, somewhat larger in diameter than tube 1. Tube 1 passes through tube 7 and becomes completely covered by the conditioner which flows by gravity around tube 1. Excess conditioner drains into tank 4 and is recycled through the mixing tank to precoating tank 4. Tube 1 then emerges from tube 7 and passes through an air blower 8 which circumferentially completely surrounds the tube and blows off excess conditioner from around the entire periphery of the tube.

The structure of the air blower 15 is shown in FIG. 3. The blower comprises an annular member 9 having a flared opening 10 for reception of advancing tube 1. An air hose 21, attached to a suitable source of compressed air, is fixedly mounted on annular member 9. Annular member 9 is in turn concentrically mounted on a second annular member 22 by threaded engagement as shown at 23 in the drawing. An annular air channel 24 and air outlet 25 is formed between members 9 and 22 and acts as a nozzle to direct the compressed air against tube 1 as it passes through passageway 26. It will be seen that the size of air channel 24 and outlet 25 is adjustable by rotation of member 9 or 23. By suitable control of air pressure and adjustment of the size of the air outlet, a circumferential air knife of uniform quality may be applied to the entire outer surface of the tube. The air knife can be tailored to tube diameter, line speed, viscosity of the conditioner and desired coating thickness. An identical air blower may also be used, as set forth below, for removing excess zinc-rich coating.

Tube 1 then passes from the precoating tank to an electric infrared oven 27. This oven cures the conditioner at a temperature which normally ranges from 350° to 450° F.

Tube 1 containing a cured conditioner coating now passes into a coating tank 30 shown in greater detail in FIG. 4. This tank is in many respects similar to precoating tank 4. Tube 1 enters the tank through a guide 31 and then passes through a larger diameter tube 32, an air blower 33 and a wiper 34. The zinc-rich coating composition in mixing tank 35 is constantly stirred by an agitator 36 to keep the coating composition in suspension in a volatile carrier. The coating composition is kept at constant temperature, e.g. 100° F. to 120° F., to maintain the proper viscosity regardless of room temperature. It is then pumped via pump 37 and pipe 38 onto tube 1 passing through a larger diameter tube 39. The zinc-rich coating flows by gravity onto tube 1, the viscosity of the coating being adjusted so that it flows around and completely covers the external surface of the tube. The tube then passes through air blower 33 which, like air blower 8 in the precoating tank, removes excess coating from the entire circumferential surface of tube 1.

Further excess coating normally accumulates by gravity on the bottom portion of tube 1 after passing through air blower 33. This is removed by flexible wiper 34 mounted against the lower portion of the tube forward of the air blower. The wiper 34 is more clearly shown in FIG. 5. It comprises a length of stiff-backed flexible short pile fabric 40 resiliently supported on a flat leaf spring 41. The spring and fabric are secured by nut and bolt 42 to a rotatably adjustable anchor 43. Counter-clockwise rotation of anchor 43 biases wiper 34 against the bottom of tube 1 and serves to give a light wipe to the bottom of the tube as it is advanced. The flexibility of the pile fabric and the resilient manner in which the wiper is mounted insures removal of only excess coating and not desirable coating thickness.

Tube 1, now containing a cured precoating and an uncured zinc-rich coating, advances into a second infrared oven 44. This oven drives off the volatile carrier from the zinc-rich coating and partially cures the coating. The temperature of the tube in this oven normally ranges from 350° to 500° F.

The tube now passes into an induction furnace 45 shown most clearly in FIG. 6. As there shown, the induction furnace comprises a water cooled copper tubing coil 46 surrounding an annular ceramic insulator 47. Audio or radio frequency current in the coil 46 heats the tube by induction as it travels through the coil. The induction furnace rapidly heats the coated tubing to a temperature of from 400° to 575° F. to completely cure or crosslink the thermosetting coating composition. The temperature of the induction heating step must be high enough to completely cure the coating at a speed consistent with adequate production rates. On the other hand, at a temperature substantially over about 550° F., lead in the terne coat begins to melt and the zinc-rich coating begins to bubble. A preferred temperature range is from 425° to 525° F. The now completely coated and cured tube is passed through a bath 55 of water to lower the temperature to a range where it may be handled, usually about room temperature.

The conditioner used for precoating is preferably an organic chromate containing a conductive pigment, an example of which is that sold by Parker Division of Oxy Metal Industries Corporation under the trade designation Oxy-Met. It should preferably be diluted with about twice its volume with deionized water. The primer coat should be a thermosetting zinc-rich primer containing about 75 to 90% zinc powder for corrosion resistance, a thermosetting resin such as a urethane, epoxy, polyester, vinyl or alkyd resin and an inorganic additive such as silica to render the composition thixotropic. The primer coat should be thinned with an organic liquid such as ethylene glycol monoethyl ether acetate, a suitable example of which is that sold under the trademark Cellosolve acetate. A particularly suitable zinc-rich primer is that sold under the product code 11BFK-17947 by Wyandotte Paint Products Company. The latter contains zinc powder, zinc chromate, a urethane-epoxy resin and an inorganic additive. It is 66.3% solids by weight, 31.7% solids by volume and has a viscosity of 110–120 seconds as measured on a No. 4 Ford Cup at 77° F. The primer coat should be thinned to a viscosity of 16 to 18 seconds as measured with a Zahn No. 2 Cup (approximately equivalent to No. 4 Ford Cup) at 100° F.

The tubing, if terne coated, will normally contain a terne coating thickness ranging as small as 0.06 ounces per square foot minimum for fuel lines to as large as 0.16 ounces per square foot minimum for break lines. The total thickness of the terne coat, precoat and primer coat will normally be on the order of 0.3 to 0.6 mils. If desirable, the tubing may also contain a further coating or coatings exterior to the primer coat.

The coated tubing of the invention, containing a terne coat, precoat and primer coat, has been found to pass a number of tests required for use of the tubing in automotive applications. The tubing has consistently passed or exceeded the specifications of the 200 hour salt spray test described in ASTM B-117-73. The tubing of the invention also passes bend tests under which the tube is bent 180° at $1\frac{1}{2}$ inch diameter and checked for adhesions and chipping. Pressure sensitive adhesive tape is applied to the outside of the bend, pulled off and examined for adherence of paint chips. The coated tube also passes brake fluid tests in which the tubing is immersed in an S.A.E. approved motor vehicle brake fluid which contains an ether such as polyalkylene glycol ether. After immersion, the tubing is removed and then permitted to remain until it is dry and then checked to see if the coating has dissolved from the tubing. The tubing of the invention consistently passes such tests.

We claim:

1. Corrosion resistant metal tubing having a first terne coating comprising a lead base alloy containing from 7–20% tin and a second coating completely covering said first coating comprising a crosslinked zinc-rich thermosetting composition.

2. The corrosion resistant metal tubing of claim 1 having a precoating between the first coating and the zinc-rich coating to enhance the adherence of the zinc-rich coating.

3. The corrosion resistant metal tubing of claim 2 in which the precoating is an organic chromate.

4. The corrosion resistant metal tubing of claim 1 in which the metal tubing is from $\frac{1}{8}''$ through $\frac{3}{4}''$ in outside diameter.

5. The corrosion resistant metal tubing of claim 1 in which the zinc-rich coating contains 75–90% zinc powder.

* * * * *

UNITED STATES PATENT AND TRADEMARK OFFICE

CERTIFICATE OF CORRECTION

PATENT NO. : 4,304,822

DATED : December 8, 1981

INVENTOR(S) : Russell G. Heyl, et al

It is certified that error appears in the above—identified patent and that said Letters Patent is hereby corrected as shown below:

On the Title page Item [75] should read:

--Russell G. Heyl, Birmingham; and Ralph A. Iorio, Bloomfield Hills, Mich.--.

Signed and Sealed this

*Twenty-third* Day of *March 1982*

[SEAL]

*Attest:*

GERALD J. MOSSINGHOFF

*Attesting Officer* *Commissioner of Patents and Trademarks*